United States Patent
Riza

(10) Patent No.: US 10,356,392 B2
(45) Date of Patent: Jul. 16, 2019

(54) CODED ACCESS OPTICAL SENSOR

(71) Applicant: University College Cork—National University of Ireland, Cork, Cork (IE)

(72) Inventor: Nabeel Agha Riza, Cork (IE)

(73) Assignee: University College Cork—National Univesity of Ireland, Cork, Cork (IE)

( * ) Notice: Subject to any disclaimer, the term of this patent is extended or adjusted under 35 U.S.C. 154(b) by 323 days.

(21) Appl. No.: 15/163,381

(22) Filed: May 24, 2016

(65) Prior Publication Data

US 2017/0026633 A1    Jan. 26, 2017

Related U.S. Application Data

(60) Provisional application No. 62/167,639, filed on May 28, 2015.

(51) Int. Cl.

| | |
|---|---|
| H04N 13/25 | (2018.01) |
| H04N 13/236 | (2018.01) |
| G01S 17/89 | (2006.01) |
| G01B 11/22 | (2006.01) |
| H04N 5/232 | (2006.01) |
| G02B 26/08 | (2006.01) |
| H04N 13/211 | (2018.01) |
| H04N 13/254 | (2018.01) |
| H04N 5/225 | (2006.01) |
| H04N 13/239 | (2018.01) |
| H04N 5/235 | (2006.01) |

(52) U.S. Cl.
CPC .......... *H04N 13/236* (2018.05); *G01B 11/22* (2013.01); *G01S 17/89* (2013.01); *G02B 26/0833* (2013.01); *H04N 5/2254* (2013.01); *H04N 5/23229* (2013.01); *H04N 5/23232* (2013.01); *H04N 13/211* (2018.05); *H04N 13/239* (2018.05); *H04N 13/25* (2018.05); *H04N 13/254* (2018.05); *H04N 5/2355* (2013.01)

(58) Field of Classification Search
None
See application file for complete search history.

(56) References Cited

U.S. PATENT DOCUMENTS

| | | | | |
|---|---|---|---|---|
| 6,316,782 | B1 * | 11/2001 | Akselrod | G01T 1/10 |
| | | | | 250/497.1 |
| 2002/0054423 | A1 * | 5/2002 | Kurematsu | G02B 26/0858 |
| | | | | 359/291 |
| 2007/0199927 | A1 * | 8/2007 | Gu | B23K 26/04 |
| | | | | 219/121.69 |

(Continued)

*Primary Examiner* — Eileen M Adams
(74) *Attorney, Agent, or Firm* — ARC IP Law, PC; Joseph J. Mayo

(57) ABSTRACT

A method for performing high dynamic range optical image detection of a scene. The method comprises imaging incident light from a scene onto an object plane of an Optical Array Device, the OAD operating in time modulation mode; determining the locations of those pixels in the object plane of a first light level; detecting the optical irradiance values of those pixels of the first light level to produce a first detected image; detecting the optical irradiance values of those pixels of a second light level to produce a second detected image; and generating a high dynamic range optical irradiance map of the scene by combining the first detected image and the second detected image into a single image.

20 Claims, 10 Drawing Sheets

(56) References Cited

U.S. PATENT DOCUMENTS

| | | | |
|---|---|---|---|
| 2011/0018465 A1* | 1/2011 | Ashdown | H05B 33/0818 |
| | | | 315/294 |
| 2014/0300608 A1* | 10/2014 | Patil | G06T 5/50 |
| | | | 345/442 |
| 2015/0009455 A1* | 1/2015 | Kemp | G02F 1/13363 |
| | | | 349/75 |
| 2015/0070741 A1* | 3/2015 | Bowron | G03B 9/02 |
| | | | 359/223.1 |
| 2016/0015489 A1* | 1/2016 | Atiya | A61C 9/0053 |
| | | | 433/29 |

* cited by examiner

CODED ACCESS OPTICAL SENSOR

The application claims the benefit of U.S. Provisional Patent Application No. 62/167,639, filed 28 May 2015, the specification of which is hereby incorporated herein by reference.

BACKGROUND OF THE INVENTION

Field of the Invention

The invention relates to performing high dynamic range optical image detection of a scene.

Description of Related Art

The ability to "see" with application-specific intelligence is critical in today's world of big data that is saturated with diverse image characteristics across fundamental science and industry. Classic state-of-the-art optical imager designs deploy photo-detector arrays such as the Charge Coupled Devices (CCDs) and the Complementary Metal Oxide Semiconductor (C-MOS) devices. These multi-pixel devices are inherently hard-wired to operate within a fixed wavelength band and spatial sampling grid, including in most cases, fixed time integration maps across the device. This highly rigid multi-pixel approach to imager design and operations today not only produces massive amount of read-out data, but also creates severe imaging limitations, such as under extreme contrast lighting conditions. This is because CCD/CMOS sensors are fundamentally limited by saturation, nonlinear response, limited spatial resolution, inter-pixel crosstalk and inter-pixel dead zone light scattering. Furthermore, when one uses custom fluorescence materials, precision lens and coding optics and nano-motion mechanics, as well as advanced computation image processing algorithms with the CCD/CMOS sensors to beat the diffraction limit, the system becomes very expensive and restricted in usage.

As a result of the drawbacks of these prior-art imagers, there is a strong need for imagers operating under extreme lighting contrast (e.g., $>10^4:1$) conditions to deliver high resolution (including beating the diffraction limit), wavelength flexibility, high dynamic range, low inter-pixel crosstalk, high Signal-to-Noise Ratio (SNR), and low cost as well as data compressed, compact and mechanically robust imager designs.

One new platform for imager design invented by the inventor of the present application is called Coded Access Optical Sensor (CAOS). This platform greatly alleviates the problems associated with the prior art imagers. This is due to the fact that the CAOS engages an electronically agile pixel platform using hybrid space-time-frequency RF coded multiple-access of a smartly sampled irradiance map that undergoes both optical and electronic domain signal processing.

Imaging of Electromagnetic (EM) radiation is a multidisciplinary challenge of fundamental importance to medical, manufacturing, astronomy, aerospace, arts, entertainment, forensics, security, research, and defense sectors. For effective deployment and impact from optical imagers, it is not only highly desirable to provide an imager which provides the features mentioned earlier, but it is also important to provide an imager which can realize portability, low energy consumption, and security of operations.

It is an object of the present invention to provide an imager which overcomes at least some of the above mentioned problems with prior art imagers.

BRIEF SUMMARY OF THE INVENTION

The present invention provides a method for performing high dynamic range optical image detection of a scene comprising: imaging incident light from a scene onto an object plane of an Optical Array Device, the OAD operating in time modulation mode; determining the locations of those pixels in the object plane of a first light level; detecting the optical irradiance values of those pixels of the first light level to produce a first detected image; detecting the optical irradiance values of those pixels of a second light level to produce a second detected image; and generating a high dynamic range optical irradiance map of the scene by combining the first detected image and the second detected image into a single image.

The method may further comprise simultaneously time modulating the incident light irradiance of one or more of the pixels on the OAD using a binary code sequence to give each of the one or more pixels a spread spectrum in the electrical frequency domain.

The light irradiance of each of the one or more pixels may be time modulated by the OAD using a unique binary code sequence.

The binary code sequence may comprise a Code Division Multiple Access, CDMA, code or a Frequency Division Multiple Access, FDMA, code or a mixed CDMA-FDMA code.

The OAD may further operate to provide analog, digital and hybrid information coding to provide isolation and robustness for each time frequency code.

The OAD may be adapted to operate in passive mode, such that the light to be imaged comes from an external radiation source.

The OAD may be adapted to operate in active mode, such that the OAD acts as an internal pixelated radiation source that illuminates the object undergoing imaging.

The OAD may comprise a Digital Micromirror Device, DMD, and wherein the method further comprises: setting the DMD micromirrors to its $-\theta$ degree tilt state to direct time static light from the object plane for detection of the optical irradiance values associated with pixels in a bright unwanted zone in the image scene; and setting the DMD micromirrors to both their $+\theta$ and $-\theta$ degree tilt states to direct time frequency modulated light from the object plane for detection of the optical irradiance values associated with pixels in a desired zone of the image scene.

The method may further comprise detecting by a first point photo detector, PD, the optical irradiance values of those pixels in the bright unwanted zone in the image scene as well as the optical irradiance values associated with the time frequency modulated light associated with pixels in the desired zone of the image scene directed from the $-\theta$ degree tilt state and detecting by a second point PD, the optical irradiance values associated with the time frequency modulated light associated with pixels in the desired zone of the image scene directed from the $+\theta$ degree tilt state, wherein the first PD and the second point PD comprise different band point PDs.

The step of generating a high dynamic range optical irradiance map may comprise the steps of: signal processing and filtering the signals detected by the first point PD and the second point PD; and performing image reconstruction on the filtered signal.

The filtering may further comprise removing all DC signals detected by the first point PD and the second point PD.

The optical image detection may be performed on fluidic samples, and wherein the OAD comprises a Light Source Array, LSA, and the optical irradiance values are detected by a point PD, the method further comprising introducing the samples undergoing imaging in the spacing between the OAD and the point PD.

The spacing may be dimensioned to provide optical near field sampling conditions.

The OAD may comprise a Digital Micromirror Device, DMD, and wherein the method further comprises: setting the DMD micromirrors to its −θ degree tilt state to direct time static light from the object plane for detection of the optical irradiance values associated with pixels of the first light level; and setting the DMD micromirrors to both their +θ and −θ degree tilt states to direct time frequency modulated light from the object plane for detection of the optical irradiance values associated with pixels of the second light level.

The method may further comprise detecting by a CCD/CMOS sensor the optical irradiance values of those pixels of the first light level as well as the optical irradiance values associated with the time frequency modulated light associated with pixels of the second light level directed from the −θ degree tilt state and detecting by a point PD the optical irradiance values associated with the time frequency modulated light associated with pixels of the second light level directed from the +θ degree tilt state.

The output of the CCD/CMOS sensor may comprise a signal carrying a DC signal associated with those pixels of the first light level and an under time sampled AC signal associated with a portion of those pixels of the second light level.

The step of generating a high dynamic range optical irradiance map may comprise the steps of: signal processing and filtering the signals detected by the CCD/CMOS sensor and the point PD; and performing image reconstruction on the filtered signal.

The filtering may further comprise removing all AC signals detected by the CCD/CMOS sensor.

The incident light from a scene may comprise scattered laser light from a 3-D target, wherein the laser light is controlled by an electronic lens.

The laser light may comprise a laser line, wherein the laser line scans the 3-D target in a single direction.

The method may further comprise calculating the depth of the 3-D target along the z direction for different y-direction locations at a given x-direction position.

Each given x-direction target depth position may be obtained by x-direction scanning the y-direction orientation laser line and adjusting the focal length of the electronic lens.

The laser light may comprise an optimised wavelength bright laser.

The external radiation source may comprise a multi-wavelength optical source and the OAD comprises a SLM based modulator.

The multi-wavelength optical source may be adapted to provide time-frequency coded multi wavelength light.

The method may provide 3-D imaging of a target and wherein the on-axis depth direction information of the target may be obtained via Time-of-Flight, TOF, laser radar and Doppler processing techniques.

The multi-wavelength optical source may comprise a laser array or a broadband diode.

The method may further comprise: passing the time-frequency coded multi wavelength light from the SLM based modulator to wavelength dispersive front end optics via a circulator and a single mode fibre, SMF; and physically separating the wavelengths of the time-frequency coded multi wavelength light to different locations in the spatial scanning zone by the dispersive front end optics.

The wavelength dispersive optics may comprise one of: a Dixon grating, a Virtual Phased Array, VPA, grating, a Photonic Crystal Prism or a silicon photonic waveguide grating coupler.

The method may further comprise returning the target reflected light at each wavelength location via the SMF and the circulator to a point PD for detection of the optical irradiance values.

The method may further comprise time-frequency coding light along one dimension of the spatial scanning zone and W-MOS wavelength coding light along the other dimension of the spatial scanning zone, and wherein the target reflected light is passed through a high dispersion fiber prior to detection by the point PD.

The step of generating a high dynamic range optical irradiance map may comprise the steps of: converting the output signal of the point PD from analog to digital; signal processing the digitized signal; and performing image reconstruction on the signal processed signal.

The dispersive front end optics may further comprise an electronic lens to provide for 3-D confocal imaging.

The present invention also provides a 3-D imaging method comprising: passing a light source through a programmable optical mask to generate one or more in focus collimated pattern targets that illuminate a 3-D scene; and capturing a plurality of defocussed images of the scene by means of a camera comprising an Optical Array Device, OAD, operating in time modulation mode to provide 3-D imaging.

The light source may comprise one of: a laser beam, a light emitting diode (LED) or a lamp light coupled with light beam forming optics.

The pattern targets may comprise a laser spot beam or a laser cross or box beam or multiple collimated sharp focus outlines.

The laser beam may be a non-diffracting laser beam for maintaining a high degree of beam collimation.

The method may further comprise programming the OAD to change the aperture of the camera to create the plurality of defocussed images.

The camera may be provided within a mobile phone

The method may further comprise providing an electronic lens in the camera to vary its focal length to create the plurality of defocussed images.

The programmable optical mask may be adapted to steer the laser beam in the transverse and lensing directions.

The method may further comprise providing an x-y scan mirror after the programmable optical mask to enable scene transverse position measurements.

The present invention also provides a Time of Flight, TOF, 3-D imaging method comprising: forming a time-frequency coded light map; projecting the time-frequency coded light map onto a 3D target such that each transverse direction pixel of the 3D target comprises a unique time frequency code; detecting the time-frequency coded light scattered from the 3-D target by a point PD, wherein a relative time delay is experienced between the detection of one or more of the scattered time-frequency coded light signals by the point PD, the relative time delay corresponding to the relative depth between the different x-y locations on the projected light.

The method may further comprise: generating at the point PD a sum of the target depth direction signals each having their own codes; recovering each coded signal representing a different x-y pixel position in the target x-y grid by electronic signal processing; and target depth processing the recovered signals to recover the time-frequency coded target depths.

The method may further comprise providing a lens for directing all the scattered time-frequency coded light signals from the 3-D target to the point PD.

The method may further comprise providing an optical scattering plate in front of the lens system.

The time-frequency coded light map may be formed from a SLM, and wherein the incident light source for the SLM is provided by a collimated laser beam.

The laser beam may comprise a non-diffraction laser beam to maintain the spatial pixels integrity of the light map as it is projected onto the 3-D target.

The time-frequency coded light map may be formed from a LED array with light projection optics or a SLM based light projector system.

The OAD may comprise a first Digital Micromirror Device, DMD, and wherein the light irradiance of N selected pixels on the OAD are simultaneously frequency modulated with N different temporal frequencies in a particular timeslot; and directing the time frequency modulated light of the N selected pixels to the +q and −q degree tilt states of the first DMD.

The method may further comprise detecting by a first point photo detector, PD, the optical irradiance values associated with the time frequency modulated light of the selected N pixels emitted from the +q degree tilt state of the first DMD; and imaging the time frequency modulated light of the selected N pixels emitted from the −q degree tilt state of the first DMD onto a wavelength dispersive optic to spatially separate the wavelengths of the light onto different spectral pixel locations on a second DMD plane, wherein the second DMD time frequency code modulates the light irradiance of each of these spectral pixel locations.

The method may further comprise detecting by a second point photo detector, PD, the optical irradiance values associated with the time frequency coded modulated light of the N pixels directed from the +q degree tilt state of the second DMD; and detecting by a Photo Detector Array, PDA, the optical irradiance values associated with the time frequency coded modulated light of the N pixels directed from the −q degree tilt state of the second DMD.

The method may further comprise the steps of: filtering and attenuating the time frequency modulated light prior to detection by the first PD, the second PD and the PDA.

The step of generating a high dynamic range optical irradiance map may comprise the steps of: signal processing the optical irradiance values detected by the first point PD, the second point PD and the PDA; and performing image reconstruction on the processed signal.

The method may further comprise providing optical field encoding.

The method may further comprise providing coherent optical detection and decoding.

The method may further comprise providing optical polarization-based encoding and decoding.

The present invention also provides a system for performing high dynamic range optical image detection of a scene comprising: means for imaging incident light from a scene onto an object plane of an Optical Array Device, the OAD operating in time modulation mode; means for determining the locations of those pixels in the object plane of a first light level; means for detecting the optical irradiance values of those pixels of the first light level to produce a first detected image; means for detecting the optical irradiance values of those pixels of a second light level to produce a second detected image; and means for generating a high dynamic range optical irradiance map of the scene by combining the first detected image and the second detected image into a single image.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
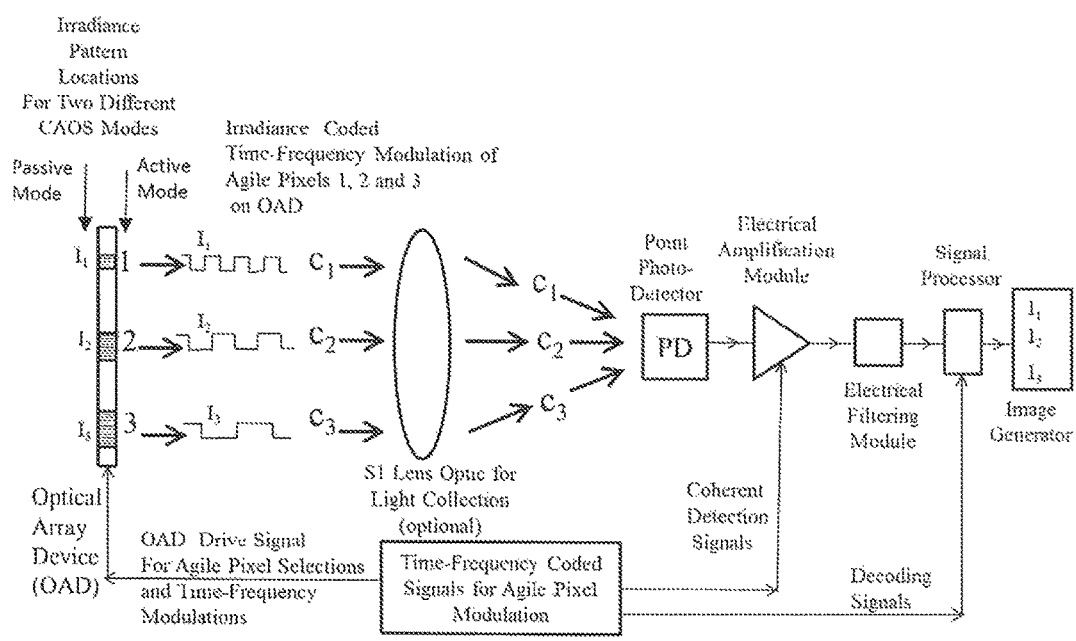
FIG. 1 shows one possible implementation of the basic CAOS imager that can operate in two modes of imaging

FIG. 1 shows one possible implementation of the basic CAOS imager. This imager can operate in two modes of imaging, namely passive mode and active mode. The passive mode of CAOS imager operation occurs when irradiance to be imaged comes from an external radiation source and falls on the OAD agile pixels-plane. The active mode of operation occurs when the OAD acts as an internal pixelated radiation source that illuminates the object undergoing imaging that for near-field imaging is placed at or adjacent to the OAD agile pixels-plane. The OAD is an electronically programmable device that allows one to select the location, shape, and size of any given $n^{th}$ agile pixel plus its time-frequency modulation characteristics to suit the particular imaging scenario. The pixel is called an agile pixel as its agility comes both in the spatial domain and time-frequency coding domain and can be electronically optimized for a given imaging scenario. The number of agile pixels N deployed is also application dependent.

As an example, FIG. 1 shows N=3 pixels each having a unique code c(t) defined by its time-frequency modulation characteristics, i.e., the irradiance $I_1$ due to agile pixel 1 (i.e., n=1) is modulated at a higher temporal frequency (shown as a digital on/off time sequence) than the irradiance $I_2$ due to agile pixel 2, which in turn is modulated at a higher temporal frequency than the irradiance $I_3$ due to agile pixel 3. Lens S1 (or concave mirror optic) is positioned to collect the individually coded optical irradiance signals on the OAD and deliver them to the point PD for optical-to-electrical signal conversion. Depending on the light's coherence properties as well as the physical aperture sizes of the OAD, S1, PD, and agile pixel set, S1 can simply act as an imaging optic between the OAD and PD planes or operate in a focus mode or a combination of the two. It is important to note that when operating with coherent light, the PD aperture being large enough does a fringe averaging operation that washes out any optical interference effects, leaving the photo-current to represent the desired sum of the agile pixel irradiance values. Note that in some cases, optical signal amplification can be deployed before the light reaches the point PD. The light collection optic S1 is not required to have an exceptional optical quality so it can spatially resolve a pixel size on the OAD. In fact, if the OAD and PD have similar active area cross-sections, they can be placed directly adjacent to each other, making an ultra-compact lens-less imager design.

The PD generated electrical signal can be written as:

$$i(t) = K \sum_{n=1}^{N} c_n(t) I_n(x_n, y_n), \quad (1)$$

where K is a constant depending on various photo-detection factors including the PD quantum efficiency. For the $n^{th}$ agile pixel on the OAD, $x_n$, $y_n$ are the pixel central coordinates, $I_n$ is the pixel irradiance, and c(t) is the pixel time-frequency code. The PD generated electrical signal containing the temporally coded pixel irradiance data set (e.g., 3 pixels for FIG. 1) next undergoes electrical amplification. This amplification operation can be stand-alone, i.e., electrically incoherent where simply the PD generated signal is electrically amplified by a fixed factor $G_A$ giving an amplified signal $i_A(t) = G_A i(t)$.

Another option is to implement electrically coherent amplification where the time-base reference frequency signal r(t) used to generate the different pixel temporal codes for the OAD also provides an electrical phase-reference for the electrical mixing operation inside a phase-locked amplifier to produce an output signal $i_C(t) = G_A r(t) i(t)$, similar to some extent to a super-heterodyne radio receiver. In both cases, the amplified signal undergoes RF filtering to block out the undesired frequency spectrum and retain the high gain signal containing the coded pixel irradiance values.

Next the amplified and filtered electrical signal is fed to a signal processor module where it undergoes time/frequency domain signal transform analysis such as Fourier spectrum analysis or correlation analysis that is used to recover each agile pixel irradiance value given the known identifier code for the given agile pixel. Take the simple case where pure frequency codes are deployed for the agile pixel coding, so $c_n(t) = \cos(2\pi f_n t)$ and incoherent electrical detection is used in the imager. In this case, simple time domain spectrum analysis or Fourier Transform (FT) in the f Hz frequency space can be conducted on the processed PD signal $i_A(t)$ with the signal processor output signal S(f) given by:

$$S(f) = FT\{i_A(t)\} = FT\left\{G_A K \sum_{n=1}^{N} c_N(t) I_n(x_n, y_n)\right\} = \quad (2)$$

$$FT\left\{G_A K \sum_{n=1}^{N} \cos(2\pi f_n t) I_n(x_n, y_n)\right\}.$$

Assuming single sideband spectrum analysis and G being a fixed spectrum analysis gain factor, one can write Eq. (2) as:

$$S(f) = G \, G_A K \sum_{n=1}^{N} I_n(x_n, y_n) \, \delta(f - f_n) \quad (3)$$

$$S(f) = G \, G_A K$$
$$\{I_1(x_1, y_1)\delta(f - f_1) + I_2(x_2, y_2)\delta(f - f_2) + I_3(x_3, y_3)\delta(f - f_3) + $$
$$\ldots + I_N(x_N, y_N)\delta(f - f_N)\}.$$

In Eq. (3), one is assuming that a single frequency spectral code appears as a Delta function of zero 3-dB bandwidth in the f Hz frequency space. In reality, each finite time duration real code signal has some finite 3-dB spectral bandwidth in Hz. The key for very low inter-pixel crosstalk in the Eq. (3) CAOS operation is to choose code frequencies not closely positioned in the instantaneous frequency space for the N simultaneously sampled agile pixels.

As shown by the Eq. (3) FT spectral output S(f) produced by the signal processor, a complete irradiance map at the time-frequency coded spatial locations on the OAD is generated by the CAOS system. In practice, the number of agile pixels processed simultaneously is application dependent as well as CAOS deployed hardware and software dependent. For the case of more complex codes $c_n(t)$, time domain correlation processing can be implemented to decode the sampled pixel irradiances values. In fact, to unleash the full power of high speed DSP, the PD provided signal can undergo immediate digitization with all signal post-processing operations handled in the all-digital space.

Figure 2:
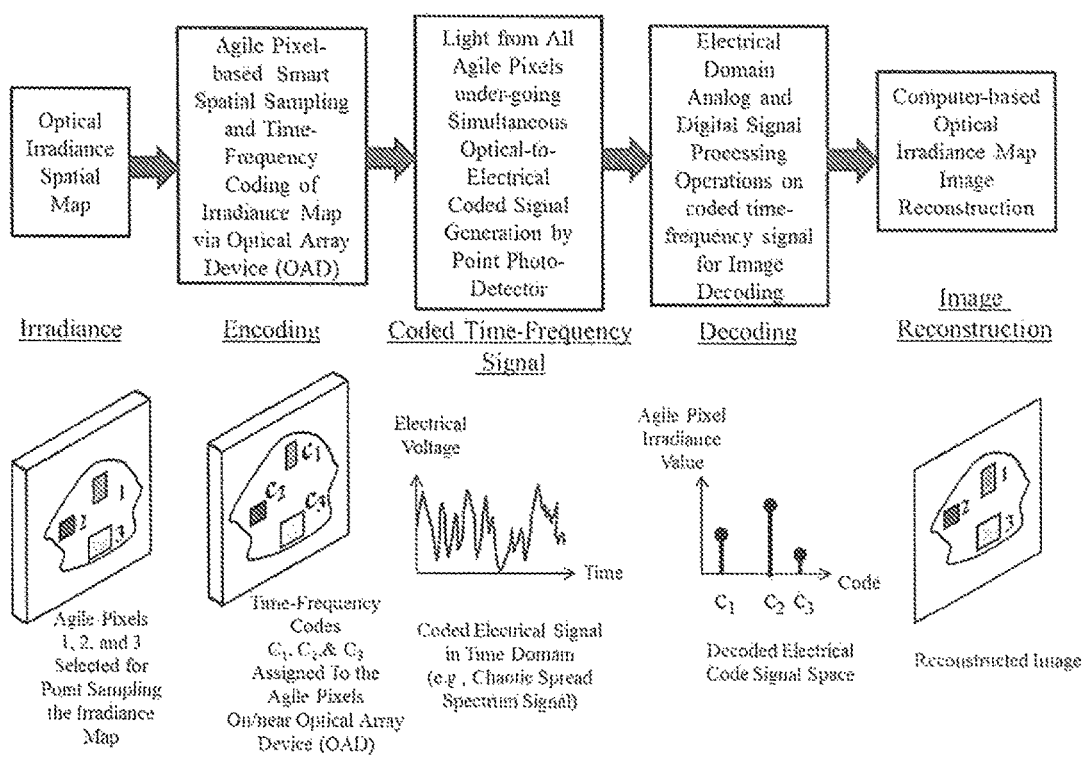
FIG. 2 shows a basic CAOS Imager Signal Flow Chart.

FIG. 2 shows a signal flow chart of the basic CAOS imager, and shows as an example 3 different sizes, shapes, and positions of the agile pixels labelled as 1, 2, and 3 that are coded with codes $c_1$, $c_2$, and $c_3$, respectively. All the time-frequency coded optical signals engage simultaneously on the PD. This optical analogy is similar to the cell phone scenario where numerous EM signals incident on a RF antenna can be viewed as being equivalent to the many optical agile pixels in the irradiance map incident simultaneously on the point PD. Decoding of agile pixel position based irradiance values is implemented by using the PD generated temporally varying electrical signal and subjecting it to high speed analog and digital electronics-based one Dimensional (1-D) coherent (i.e., electrical phased locked) or incoherent signal processing. With the agile pixel-based irradiance values recovered from what looks like a chaotic RF signal, computer-based non-iterative image (2-D) processing and reconstruction techniques are used to stitch together the 2-D optical irradiance map observed by the CAOS Imager. It should be noted that the selected sizes, shapes, and locations of the agile pixels within a given sampling time slot can be optimized to extract the desired image features with maximum SNR based on application specific intelligence.

It will thus be appreciated that complete electronic programmability gives the CAOS imager powerful attributes both as a smart spatial sampler of irradiance maps and also for electronic processing to enable high performance encoding and decoding of the agile pixel irradiance map.

It should also be appreciated that the agile pixel can operate in different programmable time-frequency coding modes like Frequency Division Multiple Access (FDMA), Code-Division Multiple Access (CDMA), and Time Division Multiple Access (TDMA). CDMA and FDMA will produce spread spectrum RF signals from the PD, while TDMA is the staring-mode operation of the CAOS imager, one agile pixel at a time producing a DC signal. For full impact of the CAOS imager, agile pixel codes should include CDMA, FDMA or mixed CDMA-FDMA codes that produce not only PD signals on a broad RF spectrum but also engage sophisticated Analog (A), Digital (D), and hybrid information coding techniques to provide isolation (e.g., minimum cross-correlation) and robustness amongst time-frequency codes used for OAD pixel coding.

Furthermore, as shown by FIG. 1, coherent (phase-locked) high sensitivity detection in the electrical domain can be used for decoding of the agile pixels. For example, high SNR correlation operations can be run in parallel using the code set to decode the pixel irradiances. These correlation operations can be run in physical hardware that forms a bank of 1-D time signal correlators, or a software-based Digital Signal Processor (DSP) or even a hybrid of the two approaches. In addition, advanced CAOS designs can also use optical field encoding and coherent optical detection and decoding.

The present invention discloses a plurality of embodiments of CAOS platform instrument designs with reference to FIGS. 3 to 10 which smartly and simultaneously engage photonic as well as electronic signal processing in the space-time-frequency coding domain. This makes possible exceptional performance imagers that greatly overcome and in many cases completely eliminates prior-art imager limitations for high contrast scenarios.

A first embodiment of a CAOS platform instrument design will now be described with reference to FIG. 3. This CAOS platform can be used to design a powerful coronagraph, such as for direct exoplanet imaging where scenes require extreme (>$10^4$) contrast sensing, e.g., Visible band (>$10^9$ contrast) and IR 1.65 and 2.1 microns (>$10^7$ contrast). The contrast power of the proposed passive CAOS coronagraph comes from simultaneously using pixel-controlled optical filtering combined with electronic filtering including electronic coherent signal processing and filtering. In effect, a cascade of filters operates on the light irradiance data to yield high contrast imaging.

Figure 3:
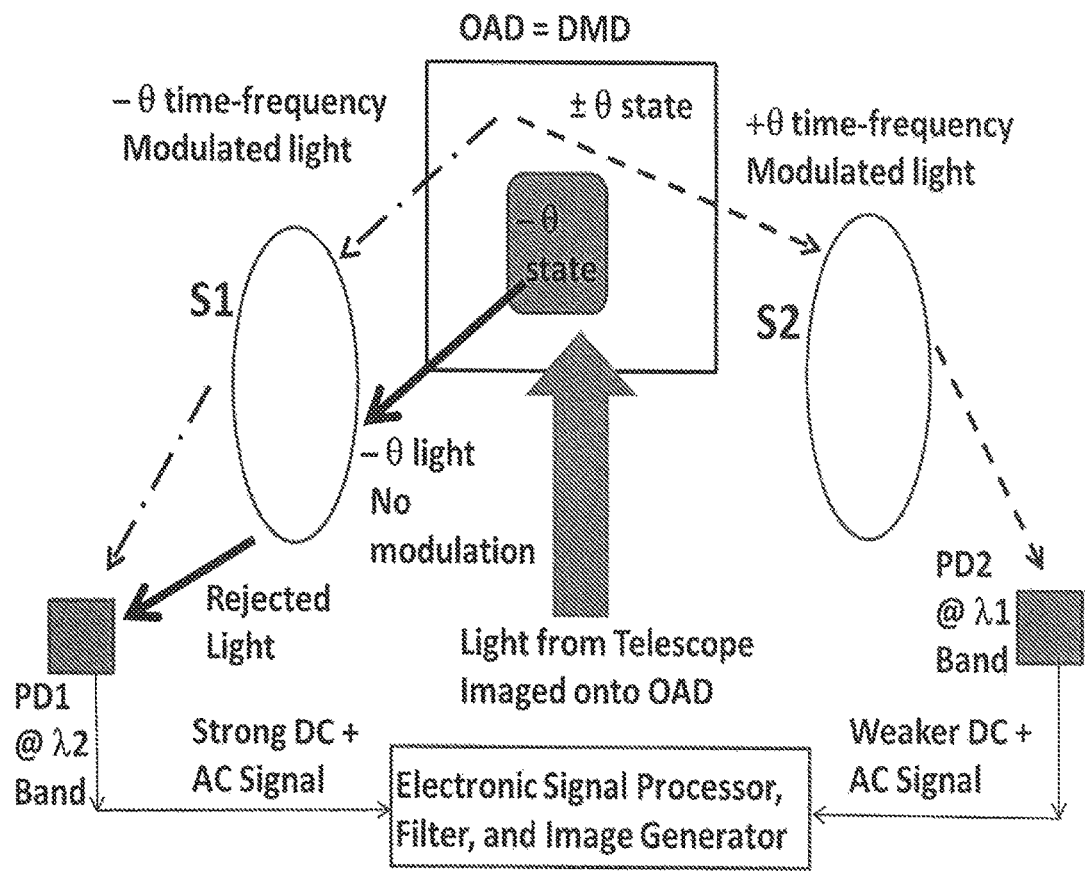
FIG. 3 shows a first embodiment of a CAOS platform instrument design.

The FIG. 3 CAOS coronagraph design uses a DMD, as the OAD can operate simultaneously with two different band point PDs, enabling simultaneous multispectral band imaging. Adding dichroic beam splitters with additional wavelength specific PD (this includes bolometers, APDs, PMTs) plus optical attenuators before the PDs, can enhance performances in terms of spectral detection, dynamic range, and sensitivity. The bright unwanted zone in the image scene is given a time static −θ micromirror state in the DMD pixel set while the desired image zone pixel set is time-frequency modulated using both ±θ digital tilt states of the DMD. The rejected light shows up as a strong DC electrical signal via PD1. Lenses S1 and S2 transfer light from the OAD plane to the PDs. The desired time-frequency coded signals provided by both PD1 and PD2 show up as AC electrical signals that undergo electronic signal processing, filtering (including DC signal blocking), and image reconstruction to produce the desired high contrast image.

Compared to prior coronagraphs, CAOS opens up the possibility of full image scene pixel programmability and spectral flexibility by using both spatial domain optical filtering plus time domain electronic filtering that can lead to potentially higher contrast (from 80 dB to 190 dB electrical dynamic range) highly adaptive astronomical imaging telescopes that can look deeper into the cosmos searching for fundamental physics answers such as via dark matter and dark energy detection. CAOS broadband imaging capability also allows high dynamic range detection of emission spectra for planetary body signature mapping.

Figure 4:
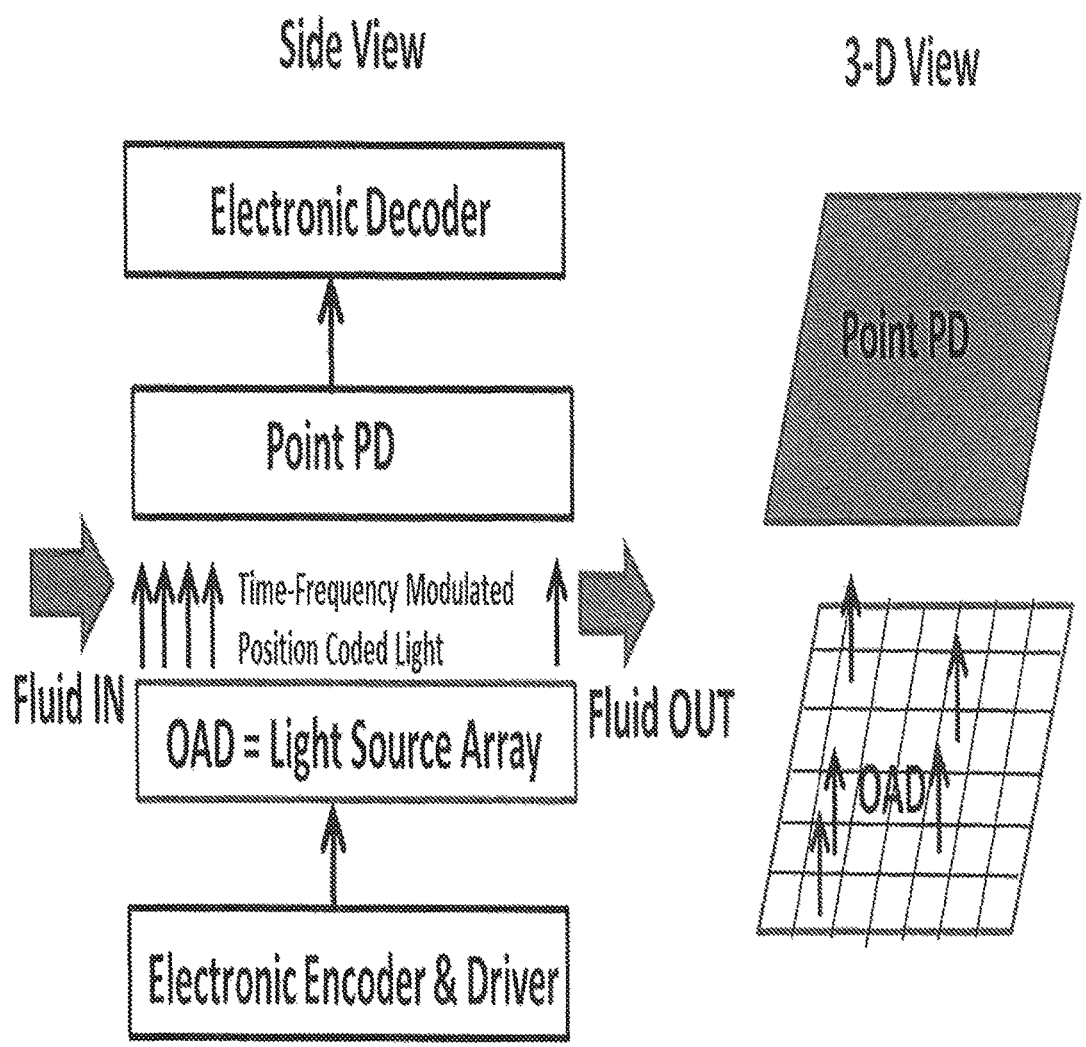
FIG. 4 shows a second embodiment of a CAOS platform instrument design.

A second embodiment of a CAOS platform instrument design which uses an ultra-compact CAOS imager cube design suitable for imaging microscopic fluidic samples will now be described with reference to FIG. 4. Imaging within the marine ecosystem is a challenging task given the fluidic environment with dark low light conditions including scattering effects. Active CAOS uses a Light Source Array (LSA) to provide an active smart lighting position-coded mechanism to extract target imaging information from a fluidic environment. The lensless design essentially consists of five chips stacked together forming a cube with the gap between the OAD chip and point PD forming the fluidic channel to introduce the samples undergoing imaging. The gap of the fluidic channel is short to ensure optical near field sampling conditions and the spatial resolution of the imager is essentially determined by the active area of the light emitters. Via control of light power at each sampling pixel location, higher contrast fluidic imaging will be possible. With LSA devices forming nano-arrays of emitters, nanoscale imaging resolutions can be expected using custom designed devices.

Figure 5:
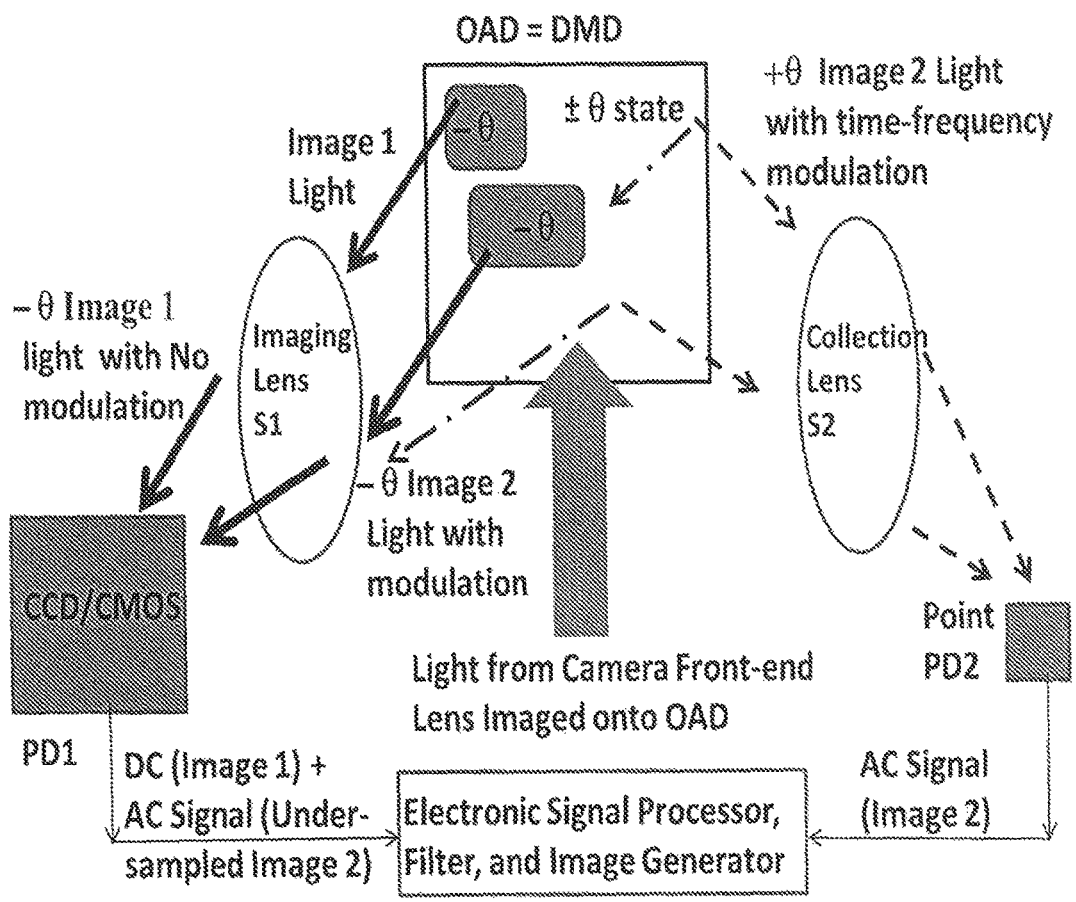
FIG. 5 shows a third embodiment of a CAOS platform instrument design.

A third embodiment of a CAOS platform instrument design will now be described with reference to FIG. 5. This figure shows a passive CAOS-CCD/CMOS dual imager instrument that can be used to extract two different light level images called Image 1 (e.g., low light image) and Image 2 (e.g., bright image) with the two images combined in software to create one high contrast image. Image 1 is created using a classic CCD/CMOS sensor as PD1 while PD2 is a higher speed point PD that has the bandwidth to sample the time-frequency modulated Image 2 select pixels in the OAD. Scheimpflug imaging condition is maintained between OAD and PD1 using lens S1. PD1 produces a DC signal carrying the Image 1 data and an under-time sampled AC signal that carries some Image 2 data. Using electronic filtering to remove the AC component, PD1 can produce the Image 1 signal. Using light collection lens S2, PD2 produces a CAOS encoded AC signal with the Image 2 select pixel data. Thus, a high contrast imager will be realized using a dual-camera system based on CAOS, as well as a CCD/CMOS sensor that engages the best features of both sensor technologies.

The Passive CAOS-CCD/CMOS Dual Imager can be optimized for machine vision applications involving extreme brightness scenarios that easily saturate classic optical cameras. These include CAOS instrument design optimizations for health and safety machine vision applications, such as mobile platforms where blinding lights can impair machine vision used to control platform manoeuvers, such as for aircrafts, cars, boats, cranes, ships, submarines, helicopters, UAVs, etc.

A fourth embodiment of a CAOS platform instrument design will now be described with reference to FIG. 6. This embodiment is related to the challenging application of far Field 3D Imaging of Coral in marine ecosystem studies.

Figure 6:
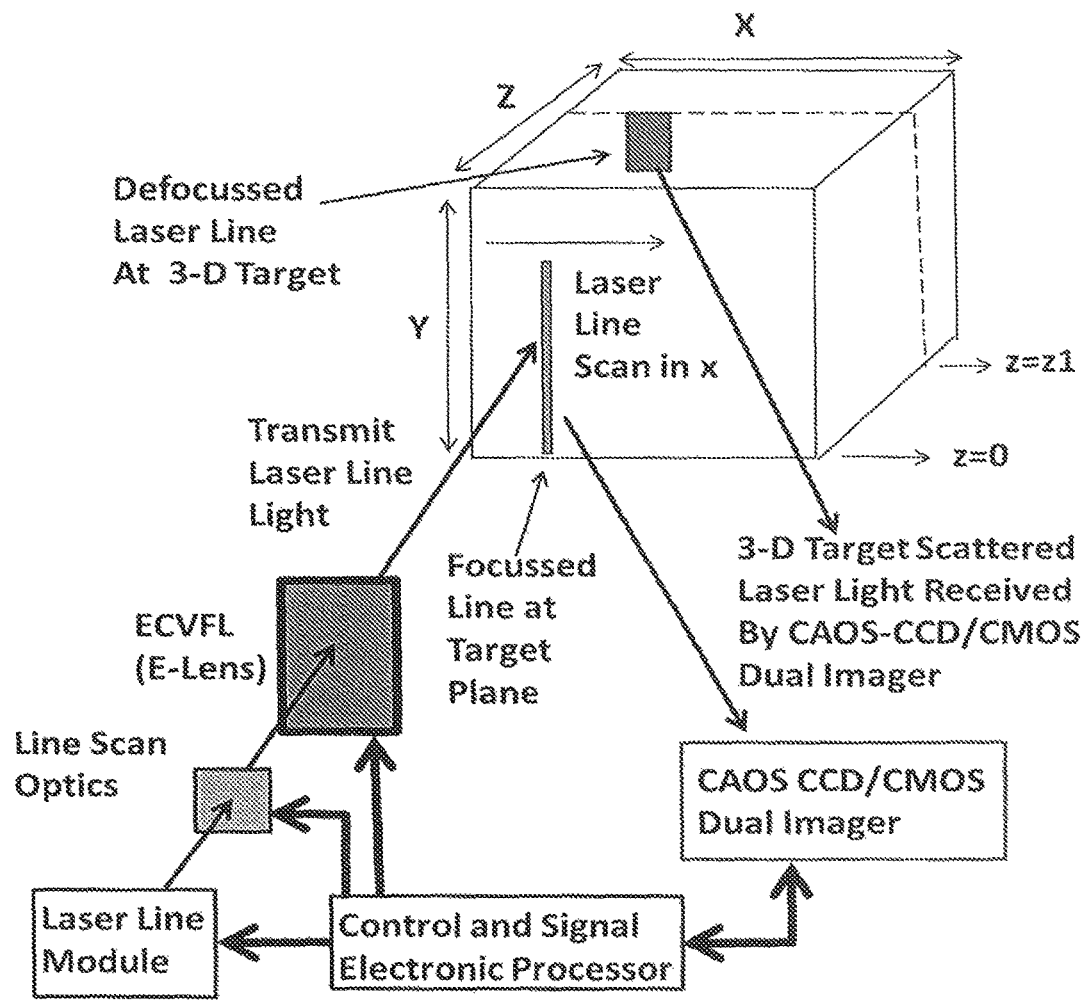
FIG. 6 shows a fourth embodiment of a CAOS platform instrument design.

As shown in FIG. 6, the CAOS platform is combined with a laser-driven electronic lens shape sensor to design a powerful 3-D imaging instrument. The sensor is a 3-D shape sensor which uses a targeting laser beam that is controlled with an Electronic Lens (E-lens) that has the highest transverse spatial resolution for 3-D optical imaging. This includes overcoming the Raleigh limit axial resolution and achieving high depth resolution maps.

In accordance with this embodiment, a laser line, after passing through an E-lens, falls on the 3-D target. A CAOS CCD/CMOS dual imager is used to view the bright laser light scattered from the 3-D target. Depending on the target depth plane (along z-direction), the line thickness (along x-direction) seen by the dual imager is different. By sweeping the E-lens focal length, the observed laser line along different y-directions of the target will produce in-focus laser lines for a different E-lens focal length. By noting these highly focussed line widths and their corresponding E-lens focal lengths, the depth of the target for the different y-direction locations at a given x-direction scan position can be computed using image processing algorithms. Scan optics moves the laser line in the x-direction so the depth measuring process along y-direction for a given x-scan can be repeated over the full x-y field-of-view of the dual imager. Because 3-D reconstruction is based on direct laser-based sampling of the target with the brightly focussed line versus a regular unconditioned expanding laser beam of lower brightness, a best spatial resolution with higher contrast imaging can be achieved. Thus, it will be appreciated that an optimized wavelength bright laser line can be used with the 3-D imager, as the CAOS-CCD/CMOS dual imager can handle bright light conditions.

Figure 7:
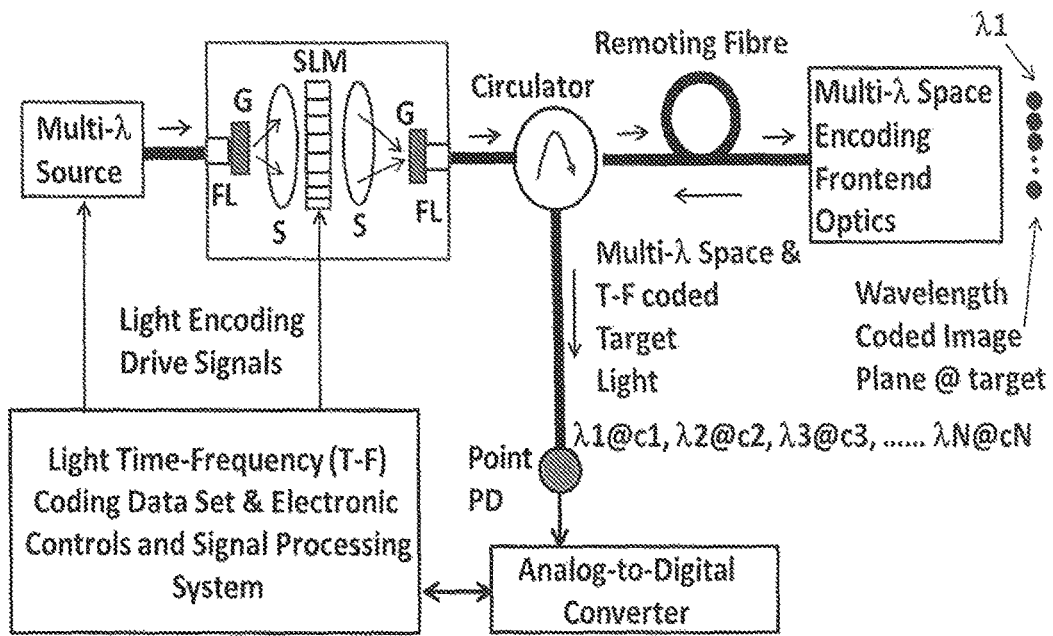
FIG. 7 shows a fifth embodiment of a CAOS platform instrument design.

A fifth embodiment of a CAOS platform instrument design will now be described with reference to FIG. 7. As shown in this Figure, the CAOS platform is engaged with a prior-art wavelength coded imager, in order to design a powerful vision system that is fibre remoted and allows endoscopic imaging of hard to access zones. Using the Single Mode Fiber (SMF) with ultracompact microoptics in the imager front-end, sizes of under 0.5 mm diameter can be realized. In this regard, it should be noted that the front end is all-passive with no electrical connections/components, although the addition of an E-lens in this front end would allow 3-D confocal imaging. In an alternate design, direct temporal modulation of the multi $\lambda$ source module along with CAOS image plane coding can allow the use of TOF light-based CW and pulsed radar techniques to enable 3-D imaging, i.e. transverse image via CAOS and on-axis depth information via TOF processing.

The imager is optically powered by a multi-wavelength optical source (e.g., laser array, broadband diode) that has the option to be electrically driven, such that each wavelength can be time-frequency coded for CAOS operations. Light from this broadband source enters a fiber-coupled array-modulator, such as an SLM-based modulator, that can provide time-frequency coding to the different wavelengths if the optical broadband source is not directly modulated for CAOS imaging coding. The CAOS time-frequency coded multiwavelength light passes through a fibre circulator to enter the remoting fibre that terminates in the wavelength dispersive front end that physically separates the wavelengths to different locations in the spatial scanning zone. Depending on the Dispersive optics used, both 1-D and 2-D grid independent wavelength coded points can be generated in the optical sampling plane. Common dispersion optic components are a Dixon grating, Virtual Phased Array (VPA) grating, Photonic Crystal Prism, silicon photonic waveguide grating coupler, etc.

Depending on the field application, one can design the required optical front end for the fibre-remoted CAOS-WMOS imager. Target reflected light at each wavelength location in the sampling grid returns via the dispersive optics into the SMF and travels via the circulator to the high speed PD. A powerful feature of this imager is the double coding of each sample pixel location at the target plane. In effect, each sample pixel has a different wavelength, creating optical isolation at the sampling grid, plus each wavelength also has its own CAOS time-frequency code that allows electrical isolation between the sampled pixels to enable spatial image decoding via electronic signal processing. The PD signal is digitized by the A-to-D converter and fed to the signal processor.

An alternate operational mode and design of the fifth embodiment is to deploy the CAOS mode to encode light along one dimension of the sample plane (e.g., y-direction with N pixels) while using W-MOS M-wavelength encoding of light along the orthogonal dimension (e.g., x-direction with M-pixels) of the illuminated sample. In this case, a high dispersion fiber needs to be engaged with the sample collected light before it reaches the point-PD so one can separate the M different wavelengths in the time domain via electronic signal processing to recover the x-direction M pixels image data tied to each wavelength.

A sixth embodiment of a CAOS platform instrument design will now be described with reference to FIG. 8. To aid understanding of this embodiment, it should be explained that Depth from Defocus (DFD) is a prior-art technique that uses multiple defocussed images of a scene recorded by an imager to determine via electronic image processing operations the depth of objects in the scene leading to 3-D imaging. This method can use for instance only two defocussed images to determine object depth, but requires the object scene to have texture so that the image processing algorithms can operate on the object scene to determine mathematical defocus operator values. Many scenes can have zones that are devoid of scene texture/pattern and researchers have projected textures in scenes to enable DFD operations. The prior-art projected texture generation methods used so far create patterns in the scene that get out of focus/sharpness for different depth locations in the scene. This in turn causes additional errors in the DFD recovery method, where ideally the projected pattern should retain focus/feature sharpness for all depth zones in the scene 3-D processing zone.

Software methods have been used to account for projector defocus, while hardware solutions offering improved projection methods with limited success have also been proposed. FIG. 8 shows the CAOS plus Laser Collimated Target Pattern-based 3-D Imager Instrument in accordance with the sixth embodiment of the invention. Any suitable CAOS 2-D imager instrument can be used to capture the defocussed 2-D images of the scene. Of course, any 2-D imager can also be used for this purpose, but the CAOS imager works well for bright laser patterns in the scene, as the FIG. 8 design uses a collimated laser beam to generate collimated laser pattern target or multiple targets in the scene being viewed. These laser created collimated targets can be a laser spot beam or laser cross or box beam (s) that naturally continues to stay focussed with very good feature sharpness for large depth distances within the scene. This thus provides the ideal projected features for a scene using DFD methods for depth recovery in scene zones lacking texture. The transmitted free-space laser beam can also be a special kind of non-diffracting beam where transverse intensity profile of the beam is unchanged with beam propagation, such as a Bessel beam, that does limit diffraction spreading and maintains a high degree of beam collimation on propagation. To acquire images of varying camera focus settings, one normally can change either the camera lens to camera sensor distance or change the aperture of the camera. In the FIG. 8 design, the OAD is electronic programmed in the CAOS platform to change the aperture of the imager to create defocussed images. In addition, the FIG. 8 design also uses an E-lens in the imager to change camera lens focal length to create defocussed images needed for DFD image processing. The E-lens can be combined with other lenses to form an autofocus lens system. Also note that the spatial filter optical mask in FIG. 8 can be a programmable optical mask device like a 2-D SLM that can not only be used to create multiple targets of desired shapes, but a phase-only SLM can also function as a 3-D beamformer to steer the laser beam in the transverse (x-y) and on-axis z (lensing) directions. The on-axis SLM lensing functions the same as placing an E-lens in the laser beam transmit path, and this allows transverse spatial sampling of the 2-D scene by the smallest size beam at the scene, thus creating very high spatial resolution transverse sampling of the scene.

Figure 8:
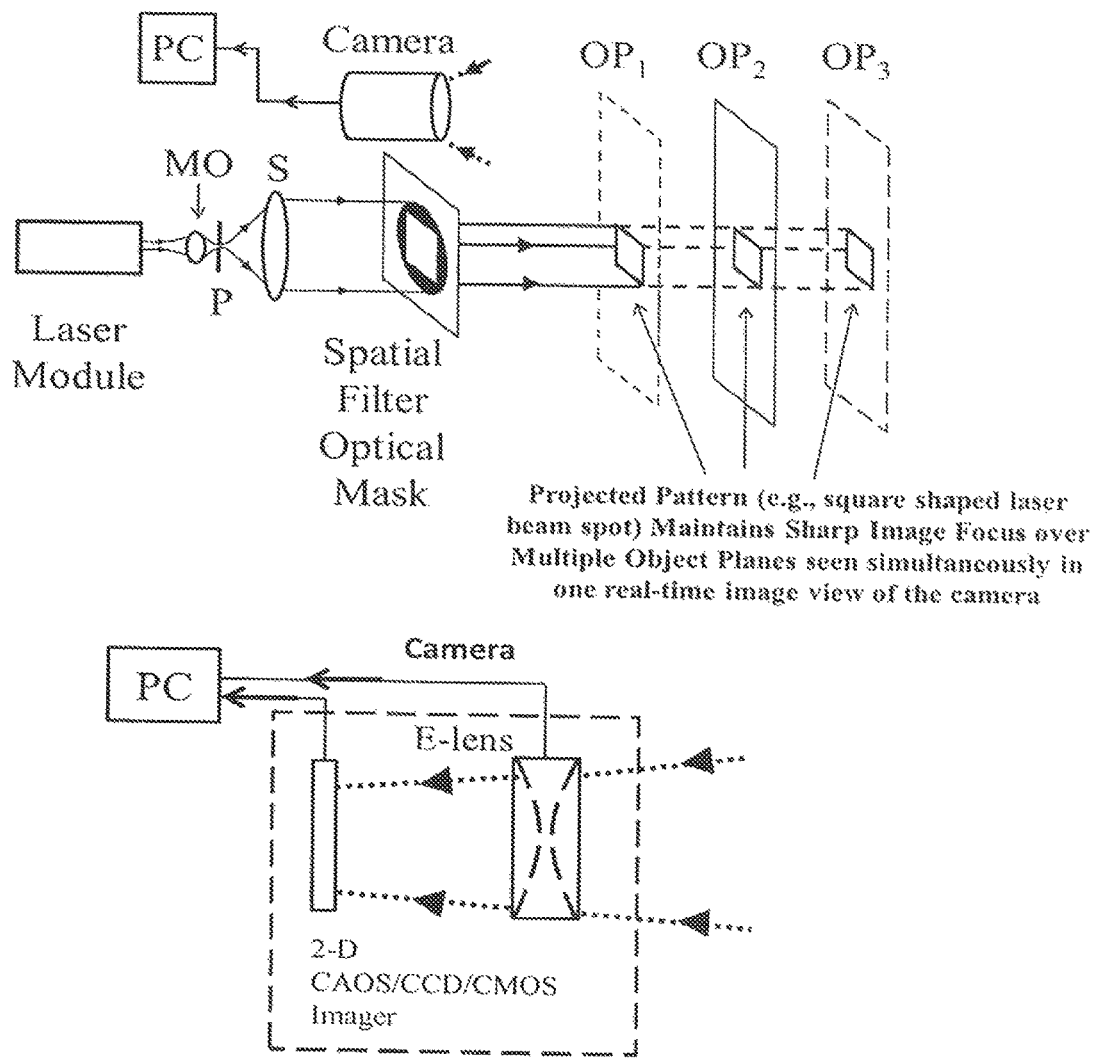
FIG. 8 shows a sixth embodiment of a CAOS platform instrument design.

Due to the fact that the system in FIG. 8 generates a target laser beam that is highly controlled and collimated in space, this same beam can be used to optically scan the 2-D scene transverse dimensions to measure the 2-D scan positions for which the DFD method computes the scene depth for each transverse direction scene location. Thus, 3-D laser-based imaging is possible with the FIG. 8 system when the transmit laser beam is scanned in the x-y transverse dimensions, such as using an x-y scan mirror combined with the optical mask SLM to measure scene x-y dimensions using geometry, and the laser x-y beam angle and measured scene depth. Thus, the FIG. 8 CAOS-based instrument becomes a powerful 3-D imager using laser beam and shape control and the image processing-based DFD technique.

The embodiment of FIG. 8 can be applied to various 3-D imaging and sensing applications, including scene depth measurement usage in auto-focus cameras such as to set camera focus to desired object depth in scene. It is important to note that a non-laser light source such as a Light Emitting Diode (LED) or lamp light coupled with appropriate light beamforming optics (e.g., a specially designed diffractive optic element) can be used to create a projected pattern that stays in sharp focus when viewed by the camera as the light travels away from the light source and towards the objects in the scene for a predesigned scene distance. One can also use the light source and camera within smart phones and tablets with some additional target creating smart optic to form an auto-focus imaging system using the DFD method.

A seventh embodiment of a CAOS platform instrument design will now be described with reference to FIG. 9. To aid understanding of this embodiment, it should be explained that Time of Flight, TOF, 3-D imaging methods have previously used CW frequency modulated light with RF phase shift processing to determine 3-D object depth using both x-y scanned laser beam and a single point photo-detector (PD) or a non-scanned laser beam with a TOF 2-D photo-sensor array with independent electronic processing high speed photo-detectors. Classic laser radar (or LIDAR) 3-D imagers have used pulse modulated light with electronic time delay signal processing (e.g., time integrating correlators) to determine 3-D object depth using x-y scanned laser beam and a single point high speed photo-detector. For fast motion capture or high speed 3D imaging, scanning of the transmitted laser beam is not desirable. Furthermore, making of a CMOS TOF photo-sensor array with high space-time-bandwidth product is not a trivial task. Thus, a 3-D TOF imager is desired that does not use laser beam scanning and a TOF photo-sensor array chip.

Figure 9:
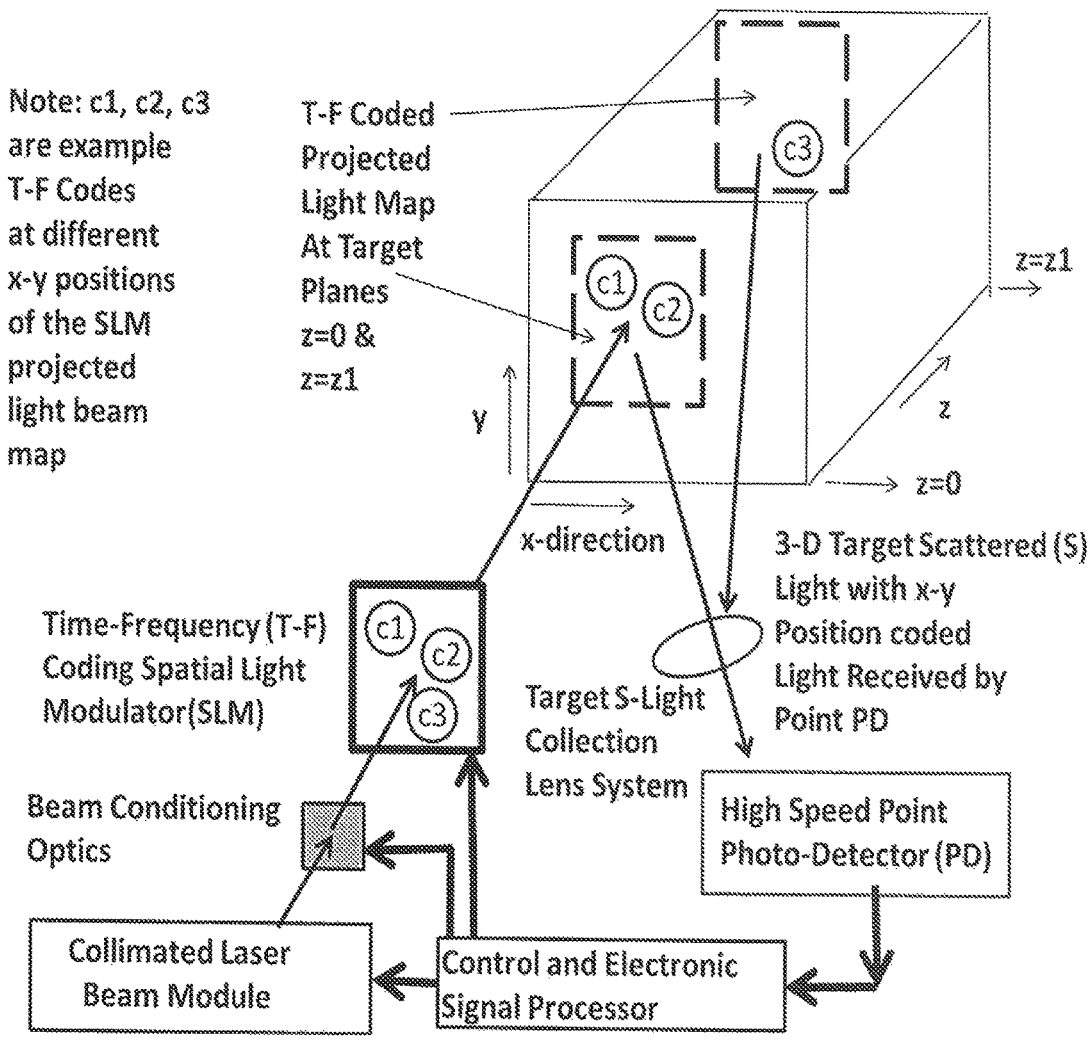
FIG. 9 shows a seventh embodiment of a CAOS platform instrument design.

FIG. 9 shows such an embodiment called a CAOS-TOF (Time of Flight) 3-D Imager Instrument. Here, the CAOS platform is used to form a Time-Frequency (T-F) coded light map that is projected onto the 3-D target. Each pixel location in the light map has a unique T-F code, for example, codes $c_1$, $c_2$, and $c_3$ shown in FIG. 9. On transmission of the light map from the SLM, each code is in time-synchronization with each other. After the projected light map scatters off the 3D target, a relative time delay between the different coded signals occurs based on the relative depth between the different x-y locations on the projected light. In FIG. 9, x-y pixel locations with codes $c_1$ and $c_2$ happen to be on the front face of the target at the z=0 location while x-y pixel location with code $c_3$ happens to be at a target depth surface located at $z=z_1$ location. Hence, there is no time delay between target scattered signal with codes $c_1$ and $c_2$, while there is a relative time delay between the scattered $c_3$ coded signal and the $c_1$,$c_2$ scattered signals. This scattered x-y position coded light is collected by a lens system that directs all the target scattered light to a high speed PD system that generates a sum of the target depth direction (z-direction in FIG. 9) signals, each having their own codes $c_1$, $c_2$, $c_3$, etc. This electronic signal is fed to electronic signal processing, where each coded signal representing a different x-y pixel position in the target x-y grid is recovered and then subjected to target depth processing (e.g., time delay, RF phase shift, etc) to recover the T-F coded target depths. Because high speed powerful electronic signal processing with sophisticated T-F codes can be engaged, a large 3-D pixel map of voxels can be generated at high speeds, a powerful feature of the FIG. 9 CAOS-TOF 3-D imager.

When using lasers for imaging with multi-pixel simultaneous detection, inter-pixel optical interference and speckle noise must be countered and various prior-art methods can be introduced into the FIG. 9 design to achieve this goal. For example, an optical scattering plate can be introduced in front of the receive lens collection optics. FIG. 9 shows a laser module as the system light source that is used to generate a highly collimated beam that is spatially pixel-code SLM modulated to produce a high collimation projected beam, so the coded-pixel map retains its particular inter-pixel spatial integrity as its travels between the different depth slices of the 3-D targeting zone. As a laser is a highly spatially coherent source, this integrity can be preserved for adequately long distances for which the system is designed. Also, the laser beam can also be of the non-diffraction type to maintain the spatial (transverse x-y direction) pixels integrity of the propagating T-F coded image map as it travels to the target under observation.

An alternate FIG. 9 design that avoids use of a laser can be one using an LED array with light projection optics or even an SLM based light projector system. In these cases, T-F modulation is implemented by the LED array or the projector SLM array. A benefit of using ToF methods in 3-D imaging is deployment of time gating on the received signals to sift out and block out undesired false echo signals such as from environmental effects, e.g., rain. The FIG. 9 system shows incoherent detection and processing of the received light signal, although coherent optical and electronic techniques can also be engaged to increase detection dynamic range and signal-to-noise ratio of the captured 3-D images.

Figure 10:
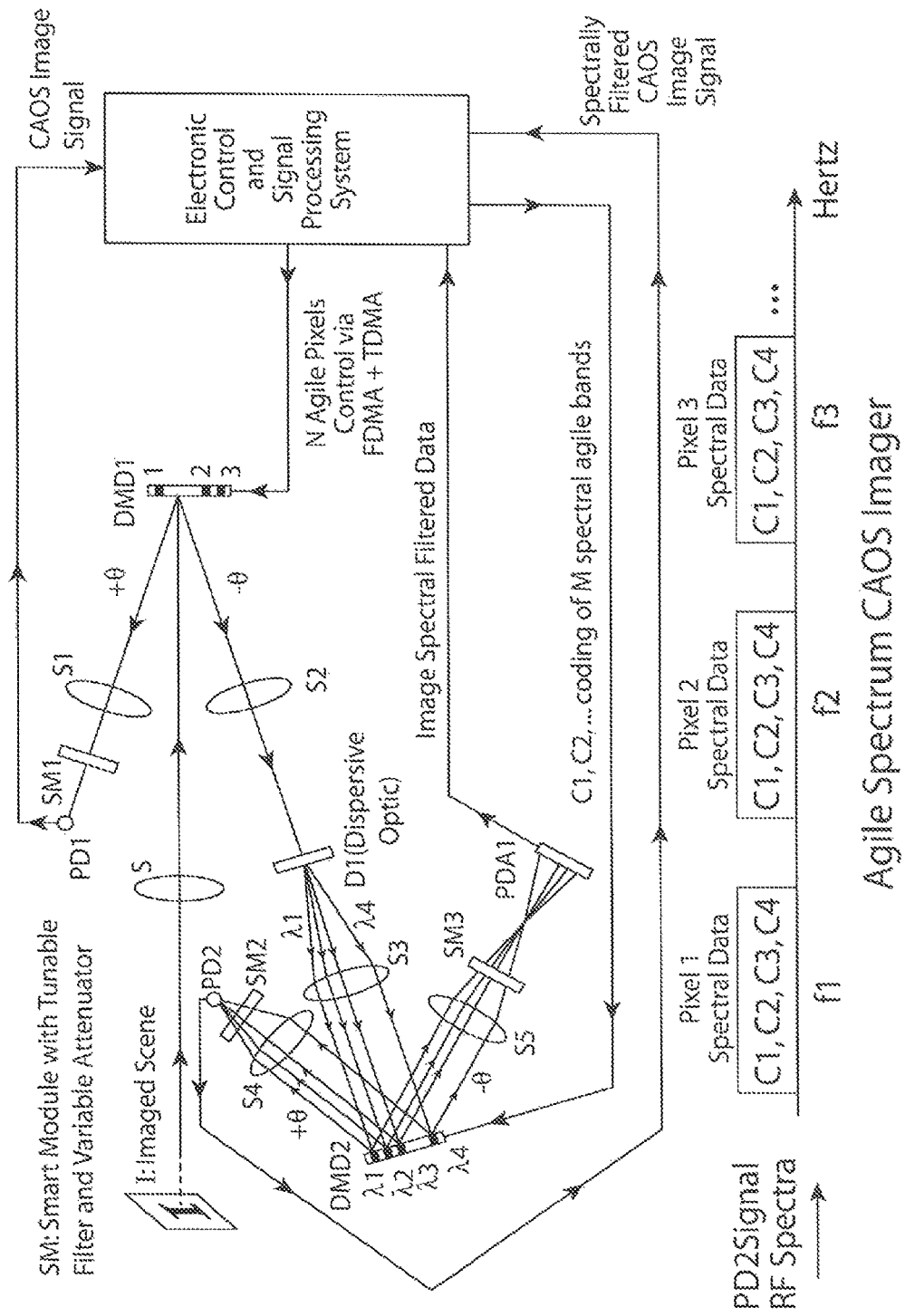
FIG. 10 shows an eight embodiment of a CAOS platform instrument design.

FIG. 10 shows another embodiment of the CAOS platform called an Agile Spectrum CAOS Imager. Here, the CAOS platform is used twice in the optical design to form a multi-purpose instrument that can provide both broadband images (standard CAOS imager) as well as fine resolution spectrally detected and filtered images, much like a multi-spectral imager or hyperspectral imager. As shown in FIG. 10, the external multi-wavelength scene labelled "I" is imaged via lens S onto the DMD1 OAD plane. DMD1 is operated in an FDMA-TDMA CAOS mode. Specifically, N agile pixels in the DMD1 plane (or image "I" plane) are selected simultaneously in a time slot T1 to be frequency modulated with N different temporal frequencies. In FIG. 10, N=3 and the frequencies corresponding to the three agile pixel locations 1, 2, 3 on DMD1 are f1, f2, f3, respectively. To access the spatial content of other spatial zones in the incident scene, another set of 3 new agile pixels is selected for FDMA modulation in the next time slot T2 of the DMD1 TDMA mode and the process is repeated again to cover the desired zones of the input image. The number of time slots and FDMA frequencies (or N) used depends on the imaging application. For fast imaging, TDMA time slots must be shortened (need to use higher FDMA frequencies) with larger N values. In fact, TDMA can be completely avoided if needed. In FIG. 10, the N Time-Frequency modulated agile pixels from DMD1 are directed to both +q and −q arms of the DMD1 reflections. The +q arm light travels through imaging lens S1 and Smart Module (SM) SM1 to strike on the point PD1, forming the basic CAOS imager (similar to FIG. 1). Each SM contains a tunable optical filter and a variable optical attenuator to optimize wavelength and light levels at the PDs. The PD1 signal contains the N pixel broadband irradiance values of the scene when the SM1 tunable filter allows broadband light to pass through to the PD1. The PD1 signal is fed to the electronic control and processing system that controls the instrument devices and signal processes the input data to create the desired spectrum agile images. The −q arm light from DMD1 travels though lens S2 to be imaged onto a wavelength dispersive optic D1 (e.g., grating or prism, etc) that spatially separates the various wavelengths present in the N agile pixels selected by DMD1. DMD2 and D1 are placed at the focal planes of lens S3. For the FIG. 10 example, N=3 agile pixels contain wavelengths across M=4 possible wavelength bands labelled as l1, l2, l3, and l4 that are located at different spectral pixel locations on the DMD2 plane. DMD2 is operated in the CDMA CAOS mode such that the spectral pixel locations, e.g., l1, l2, l3, and l4 are time-frequency code modulated by codes c1, c2, c3, and c4, respectively. The +q arm light from DMD2 travels though lens S4 and SM2 to be imaged onto a point PD2. The electrical signal from PD2 contains the l1, l2, l3, and l4 spectral strength values for all N=3 pixels selected on the incident scene at the DMD1 plane. Note that each 4-wavelength set for a given agile pixel of the image is modulated at its own FDMA frequency value and so can be separated in the frequency (Hertz) domain from the other 4-wavelength sets for the other agile pixels of the image. To cover the 4-wavelength content within an agile pixel, note that each wavelength band has its own time-frequency code, e.g., c1 for l1, c2 for l2, etc. So appropriate decoding of the CDMA coded signal in the electronic processor leads to high dynamic range detection of the strengths of the spectral content of the light present in the given agile pixel in the scene. SM2's tunable filter can further provide additional image spectral control in the optical domain. Thus, a multispectral imager and hyperspectral imager is formed with exceptional dynamic range operations for both spectral detection as well as filtering. The number M and its spectral locations chosen on DMD2 depends on the imaging application and can be adjusted as needed. Note that FDMA coding can also be used to code the multiple wavelength agile pixels on DMD2. In this case, the FDMA modulation frequencies used for wavelength coding should be chosen to be low enough to prevent frequency overlap between adjacent agile pixel RF spectra such as between the f1 band and the f2 band. The wavelength dispersed −q arm light from DMD2 travels though lens S5 and SM3 to be imaged onto a Photo Detector Array PDA1, e.g., CCD/CMOS/FPA sensor. To produce spectra of pixels via PDA1, both DMD1 and DMD2 need their pixels to be programmed in static stare modes within a PDA frame integration time. Agile pixels of the scene on DMD1 are scanned sequentially one at a time in TDMA mode matching PDA1 frame times. Then the spectra per agile pixel that is detected and measured by PDA1 are processed electronically by the processor to produce the hyperspectral image cube. DMD2 can also be programmed to spatially filter/reject unwanted spectra in the output image. Furthermore, in the focal plane of S5, another dispersive optic D2 (not shown in FIG. 10) can be placed to recombine the different wavelengths in an agile pixel and another imaging lens can be used after D2 to create a broadband filtered image on a 2-D PDA.

Compared to prior-art imagers, the CAOS platform designs of the present invention provide numerous advantages. These include:

(a) Direct use of both photonic domain and electronic domain information processing. This cascading image control architecture forms a serial-parallel high noise rejection processor that enables generation of high SNR images, in particular for high contrast imaging applications.

(b) The agile pixel space-time-frequency characteristics can be programmed to suit the imaging scenario with adaptive control deployed as needed.

(c) Staring mode PDs such as CCD/CMOS sensors naturally produce a photo-detection electrical noise spectrum that is dominant around the DC and lower frequency components. The CAOS imager produces its photo-detected signal at a temporal frequency band that is away from the noisy part of the PD output near DC, thus creating a higher SNR signal for decoding signal processing. All electronics are fundamentally subjected to 1/frequency (f) or 1/f noise. By having the output signal frequency band for the PD in the CAOS imager away from DC, the 1/f noise in the signal processing electronics chain is also lower, as f can be from tens of Hertz to many GHz.

(d) After photo-detection, electrical domain coherent detection such as with electronic mixing plus phased locked amplification and filtering can provide detection of extremely weak signals buried in noise, thus enabling high contrast imaging. The CAOS imager exploits this coherent detection and processing feature in the robust electrical domain versus a vibration/optical phase sensitive optical domain of traditional optical interferometry.

(e) Advanced CAOS designs can also use optical field encoding and coherent optical detection and decoding that can provide D-to-A & A-to-D converter speeds up-to 90 Giga-Samples/second that are integrated with DSP processors containing near 100 million gates.

(f) The spatial imaging resolution of the CAOS imager is determined by the size of the agile pixel selected for time-frequency coded modulation on the OAD and not by the optical quality of the diffraction limited optic S1 when considering near-field imaging. For passive mode of operations, the OAD is a transmissive (or reflective) Spatial Light Modulator (SLM) device. In this case, the smallest size of the time-frequency modulating agile pixel is the smallest size of the programmable pixel in the SLM. Various SLM technologies can be deployed such as using optical MEMS/NEMS, liquid crystals, Multiple Quantum Wells, etc. Optically addressed pixel structure-free SLMs can also be deployed as the OAD. In the case of imager active mode operations, the OAD is a light source array device like a 2-D optical display device, e.g., a 2-D laser array or a 2-D LED array or a fiber-waveguide array coupled light source array.

Depending on the OAD technology, in the near future one can even envision a pixel size as small as an atomic radiator, easily beating the diffraction limit for near field imaging.

(a) Because all agile pixel positions and their irradiances on the OAD are coded in time-frequency and decoding of pixel information no longer depends on the optical diffraction limits of the lens optics in the imager, exceptionally low inter-pixel crosstalk levels can be achieved via the electronic signal processing operations even when the pixel sizes are much smaller than the Abbe diffraction limit.

(b) The optical signal incident on the PD as well as the PD generated electrical signal look chaotic and are inherently secure as the image cannot be recovered without the pixel codes needed for decoding at the receiver.

(c) The CAOS platform is extendable to Three Dimensional (3-D) imaging techniques including light sheet, confocal, and wavelength diversity-based methods, by also applying time-frequency coding to pixels in the third spatial dimension. In addition, the CAOS imager can be combined with classical 2-D CCD/CMOS-based imagers to interrogate sub-2-D image zones in the full 2-D image space where sub-critical data must be extracted from the image scene.

(d) Because a high speed point PD is used for optical-to-electrical conversion with imaged pixel positions simultaneously detected and have coding with significantly high electrical frequency content (i.e., short sampling period in the time domain), fast 3D imaged objection motion effects can be captured using electrical frequency-based Doppler signal processing and Time-of-Flight (TOF) light-based CW and pulsed radar techniques.

(e) The CAOS platform is extendable to multispectral imaging allowing both spatial (i.e., optical spatial domain) and time-frequency (electronic) domain detection and filtering of optical image wavelengths leading to a high image dynamic range imager and spectral filter, respectively.

The CAOS instrument designs proposed in this application can also be implemented for various specific high impact imaging applications such as astronomy (exoplanets), marine ecosystem monitoring (e.g., Coral), and industrial manufacturing (3D Machine vision). 2014 USA NOAA report has declared coral reef future survival as a devastating problem with corals providing $30 Billion in global economic benefits and the CAOS imagers presented in this application can provide new 2-D and 3-D images of the marine coral ecosystem.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means. In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A method for performing high dynamic range optical image detection of a scene comprising:
    imaging incident light from a scene onto an object plane of an Optical Array Device (OAD), the OAD operating in time modulation mode such that an irradiance of one or more pixels in the object plane of the OAD from the incident light is simultaneously time modulated using a unique binary code sequence to give each of the one or more pixels a spread spectrum in an electrical frequency domain;
    determining locations of pixels in the object plane of a first light level;
    detecting optical irradiance values of the pixels of the first light level to produce a first detected image;
    detecting optical irradiance values of the pixels of a second light level to produce a second detected image; and
    generating a high dynamic range optical irradiance map of the scene by combining the first detected image and the second detected image into a single image.

2. The method of claim 1, wherein the method further comprises simultaneously time modulating the irradiance of one or more of the pixels in the object plane of the OAD from the incident light using a Code Division Multiple Access (CDMA) code or a Frequency Division Multiple Access (FDMA) code or a mixed CDMA-FDMA code.

3. The method of claim 1, wherein the OAD comprises a Digital Micromirror Device (DMD) operating in passive mode, and wherein the method further comprises:
    setting the DMD micromirrors to its $-\theta$ degree tilt state to direct time static light from the object plane for detection of the optical irradiance values associated with pixels in a bright unwanted zone in the image scene; and
    setting the DMD micromirrors to both their $+\theta$ and $-\theta$ degree tilt states to direct time frequency modulated light from the object plane for detection of the optical irradiance values associated with pixels in a desired zone of the image scene.

4. The method of claim 1, wherein the OAD comprises a DMD operating in passive mode, and wherein the method further comprising
    detecting by a first point photo-detector (PD), the optical irradiance values of the pixels in a bright unwanted zone in the image scene as well as the optical irradiance values associated with time frequency modulated light associated with pixels in the desired zone of the image scene directed from the $-\theta$ degree tilt state of the DMD; and
    detecting by a second point PD, the optical irradiance values associated with time frequency modulated light associated with the pixels in the desired zone of the image scene directed from the $+\theta$ degree tilt state of the DMD, wherein the first PD and the second point PD comprise different band point PDs.

5. The method of claim 1, where the step of generating a high dynamic range optical irradiance map comprises the steps of:
    signal processing and filtering the detected optical irradiance values, and
    performing image reconstruction on the filtered signal.

6. The method of claim 1, wherein the optical image detection is performed on fluidic samples, and wherein the OAD comprises a Light Source Array (LSA) operating in active mode, and the optical irradiance values are detected by a point photo-detector (PD), and the method further comprising introducing the fluidic samples undergoing imaging in a spacing between the OAD and the point PD.

7. The method of claim 1, wherein the OAD comprises a Digital Micromirror Device (DMD) operating in passive mode, and wherein the method further comprises:
   setting the DMD micromirrors to its −θ degree tilt state to direct time static light from the object plane for detection of the optical irradiance values associated with the pixels of the first light level; and
   setting the DMD micromirrors to both their +θ and −θ degree tilt states to direct time frequency modulated light from the object plane for detection of the optical irradiance values associated with the pixels of the second light level.

8. The method of claim 1, wherein the OAD comprises a Digital Micromirror Device (DMD) operating in passive mode, the method further comprising
   detecting by a CCD/CMOS sensor the optical irradiance values of the pixels of the first light level as well as the optical irradiance values associated with time frequency modulated light associated with the pixels of the second light level directed from a −θ degree tilt state of the DMD; and
   detecting by a point photo-detector (PD) the optical irradiance values associated with time frequency modulated light associated with pixels of the second light level directed from a +θ degree tilt state of the DMD.

9. The method of claim 1, wherein the incident light from a scene comprises scattered laser light from a 3-D target, wherein the laser light is controlled by an electronic lens, wherein the laser light scans the 3-D target in a single direction, the method further comprising calculating a depth of the 3-D target along a z direction for different y-direction locations at a given x-direction position, wherein each given x-direction target depth position is obtained by x direction scanning a y direction orientation laser light and adjusting a focal length of the electronic lens.

10. The method of claim 1, wherein the OAD comprises a Spatial Light Modulator (SLM) based modulator, and wherein light to be imaged comes from an optical source adapted to provide time-frequency coded multi wavelength light, the method further comprising:
    passing the time-frequency coded multi wavelength light from the SLM based modulator to wavelength dispersive front end optics via a circulator and a single mode fibre (SW); and
    physically separating wavelengths of the time-frequency coded multi wavelength light to different locations in a spatial scanning zone by the dispersive front end optics, and
    returning target reflected light at each wavelength location via the SW' and the circulator to a point photo-detector (PD) for detection of the optical irradiance values.

11. The method of claim 1, wherein the OAD comprises a first Digital Micromirror Device (DMD) operating in passive mode, and wherein an irradiance of the incident light of N selected pixels on the OAD are simultaneously frequency modulated with N different temporal frequencies in a particular timeslot; the method further comprising
    directing the time frequency modulated light of the N selected pixels to the +θ and −θ degree tilt states of the first DMD;
    detecting by a first point photo-detector (PD), the optical irradiance values associated with the time frequency modulated light of the selected N pixels emitted from the +θ degree tilt state of the first DMD;
    imaging the time frequency modulated light of the selected N pixels emitted from the −θ degree tilt state of the first DMD onto a wavelength dispersive optic to spatially separate the wavelengths of the light onto different spectral pixel locations on a second DMD plane, wherein the second DMD time frequency code modulates the light irradiance of each of the spectral pixel locations;
    detecting by a second point photo-detector (PD), the optical irradiance values associated with the time frequency coded modulated light of M selected pixels directed from the +θ degree tilt state of the second DMD; and
    detecting by a Photo Detector Array (PDA), the optical irradiance values associated with the time frequency coded modulated light of the M selected pixels directed from the −θ degree tilt state of the second DMD.

12. A computer implemented system for performing high dynamic range optical image detection of a scene configured with one or more modules to:
    image incident light from a scene onto an object plane of an Optical Array Device (OAD), the OAD operating in time modulation mode such that an irradiance of one or more pixels in the object plane of the OAD from the incident light is simultaneously time modulated using a unique binary code sequence to give each of the one or more pixels a spread spectrum in an electrical frequency domain;
    determine locations of pixels in the object plane of a first light level;
    detect the optical irradiance values of the pixels of the first light level to produce a first detected image;
    detect the optical irradiance values of the pixels of a second light level to produce a second detected image; and
    generate a high dynamic range optical irradiance map of the scene by combining the first detected image and the second detected image into a single image.

13. A method for performing high dynamic range optical image detection of a scene comprising:
    imaging incident light from a scene onto an object plane of an Optical Array Device (OAD), the OAD operating in time modulation mode, wherein the OAD comprises a Digital Micromirror Device (DMD) operating in passive mode;
    setting the DMD to its −θ degree tilt state to direct time static light from the object plane for detection of optical irradiance values associated with pixels in a bright unwanted zone in the image scene;
    setting the DMD to both its +θ and −θ degree tilt states to direct time frequency modulated light from the object plane for detection of optical irradiance values associated with pixels in a desired zone of the image scene;
    detecting optical irradiance values of the time frequency modulated pixels of a first light level to produce a first detected image;
    detecting optical irradiance values of the time frequency modulated pixels of a second light level to produce a second detected image; and
    generating a high dynamic range optical irradiance map of the desired zone of the image scene by combining the first detected image and the second detected image into a single image.

14. A method for performing high dynamic range optical image detection of a scene comprising:
   imaging incident light from a scene onto an object plane of an Optical Array Device (OAD), the OAD operating in time modulation mode, wherein the OAD comprises a DMD operating in passive mode;
   detecting by a first point photo-detector (PD), optical irradiance values of pixels in a bright unwanted zone in the image scene as well as t optical irradiance values associated with time frequency modulated light associated with pixels in a desired zone of the image scene directed from the −θ degree tilt state of the DMD;
   detecting by a second point PD, optical irradiance values associated with time frequency modulated light associated with pixels in the desired zone of the image scene directed from the +θ degree tilt state of the DMD, wherein the first PD and the second point PD comprise different band point PDs;
   producing a first detected image from detected optical irradiance values of the time frequency modulated pixels of a first light level;
   producing a second detected image from detected optical irradiance values of the time frequency modulated pixels of a second light level; and
   generating a high dynamic range optical irradiance map of the desired zone of the image scene by combining the first detected image and the second detected image into a single image.

15. A method for performing high dynamic range optical image detection of a scene comprising fluidic samples comprising:
   introducing fluidic samples undergoing imaging in a spacing between an Optical Array Device (OAD) and a point photo-detector (PD), wherein the OAD comprises a Light Source Array (LSA) operating in active mode;
   imaging incident light from the fluidic samples onto an object plane of the OAD, the OAD operating in time modulation mode;
   determining locations of pixels in the object plane of a first light level;
   detecting optical irradiance values of the pixels of the first light level to produce a first detected image;
   detecting optical irradiance values of the pixels of a second light level to produce a second detected image; wherein the optical irradiance values are detected by the point PD; and
   generating a high dynamic range optical irradiance map of the scene by combining the first detected image and the second detected image into a single image.

16. A method for performing high dynamic range optical image detection of a scene comprising:
   imaging incident light from a scene onto an object plane of an Optical Array Device (OAD), the OAD operating in time modulation mode, wherein the OAD comprises a Digital Micromirror Device (DMD) operating in passive mode;
   setting the DMD to its −θ degree tilt state to direct time static light from the object plane for detection of optical irradiance values associated with pixels of a first light level;
   setting the DMD to its +θ and −θ degree tilt states to direct time frequency modulated light from the object plane for detection of optical irradiance values associated with pixels of a second light level;
   detecting optical irradiance values of the pixels of the first light level to produce a first detected image;
   detecting optical irradiance values of the pixels of the second light level to produce a second detected image; and
   generating a high dynamic range optical irradiance map of the scene by combining the first detected image and the second detected image into a single image.

17. A method for performing high dynamic range optical image detection of a scene comprising:
   imaging incident light from a scene onto an object plane of an Optical Array Device (OAD), the OAD operating in time modulation mode, wherein the OAD comprises a Digital Micromirror Device (DMD) operating in passive mode;
   detecting by a CCD/CMOS sensor optical irradiance values of pixels of a first light level as well as optical irradiance values associated with time frequency modulated light associated with pixels of a second light level directed from a −θ degree tilt state of the DMD; and
   detecting by a point photo-detector (PD) optical irradiance values associated with time frequency modulated light associated with pixels of the second light level directed from a +θ degree tilt state of the DMD;
   producing a first detected image from detected optical irradiance values of the pixels of the first light level;
   producing a second detected image from detected optical irradiance values of the pixels of the second light level; and
   generating a high dynamic range optical irradiance map of the scene by combining the first detected image and the second detected image into a single image.

18. A method for performing high dynamic range optical image detection of a scene comprising:
   imaging incident light from a scene onto an object plane of an Optical Array Device (OAD), the OAD operating in time modulation mode,
      wherein the incident light from a scene comprises scattered laser light from a 3-D target, and
      wherein the laser light is controlled by an electronic lens, wherein the laser light scans the 3-D target in a single direction;
   calculating a depth of the 3-D target along a z direction for different y-direction locations at a given x-direction position, wherein each given x-direction target depth position is obtained by x direction scanning a y direction orientation laser light and adjusting a focal length of the electronic lens;
   determining locations of pixels in the object plane of a first light level;
   detecting optical irradiance values of the pixels of the first light level to produce a first detected image;
   detecting optical irradiance values of the pixels of a second light level to produce a second detected image; and
   generating a high dynamic range optical irradiance map of the scene by combining the first detected image and the second detected image into a single image.

19. A method for performing high dynamic range optical image detection of a scene comprising:
   imaging incident light from a scene onto an object plane of an Optical Array Device (OAD), the OAD operating in time modulation mode,
      wherein the OAD comprises a Spatial Light Modulator (SLM) based modulator, and
      wherein light to be imaged comes from an optical source adapted to provide time-frequency coded multi wavelength light;

passing the time-frequency coded multi wavelength light from the SLM based modulator to wavelength dispersive front end optics via a circulator and a single mode fibre (SMF); and physically separating wavelengths of the time-frequency coded multi wavelength light to different locations in a spatial scanning zone by the dispersive front end optics, and returning target reflected light at each wavelength location via the SW' and the circulator to a point photo-detector (PD) for detection of optical irradiance values;

detecting by the point PD optical irradiance values of pixels in the object plane of a first light level to produce a first detected image;

detecting by the point PD optical irradiance values of pixels in the object plane of a second light level to produce a second detected image; and generating a high dynamic range optical irradiance map of the scene by combining the first detected image and the second detected image into a single image.

20. A method for performing high dynamic range optical image detection of a scene comprising:

imaging incident light from a scene onto an object plane of an Optical Array Device (OAD), the OAD operating in time modulation mode, wherein the OAD comprises a first Digital Micromirror Device (DMD) operating in passive mode; and wherein irradiance of the incident light of N selected pixels on the first DMD are simultaneously frequency modulated with N different temporal frequencies in a particular timeslot;

directing the time frequency modulated light of the N selected pixels to the $+\theta$ and $-\theta$ degree tilt states of the first DMD;

detecting by a first point photo detector, PD, optical irradiance values associated with the time frequency modulated light of the selected N pixels emitted from the $+\theta$ degree tilt state of the first DMD, imaging the time frequency modulated light of the selected N pixels emitted from the $-\theta$ degree tilt state of the first DMD onto a wavelength dispersive optic to spatially separate the wavelengths of the light onto different spectral pixel locations on a second DMD plane, wherein the second DMD time frequency code modulates the light irradiance of each of these spectral pixel locations;

detecting by a second point photo detector, PD, optical irradiance values associated with the time frequency coded modulated light of M selected pixels directed from the $+\theta$ degree tilt state of the second DMD;

detecting by a Photo Detector Array, PDA, optical irradiance values associated with the time frequency coded modulated light of the M selected pixels directed from the $-\theta$ degree tilt state of the second DMD;

producing a first detected image from detected optical irradiance values of pixels of a first light level;

producing a second detected image from detected optical irradiance values of pixels of a second light level; and generating a high dynamic range optical irradiance map of the scene by combining the first detected image and the second detected image into a single image.

* * * * *